US012792876B2

(12) United States Patent
Hawthorne et al.

(10) Patent No.: US 12,792,876 B2
(45) Date of Patent: Nov. 10, 2026

(54) GENERATING SEQUENCES OF DATA ELEMENTS USING CROSS-ATTENTION OPERATIONS

(71) Applicant: GDM Holding LLC, Mountain View, CA (US)

(72) Inventors: Curtis Glenn-Macway Hawthorne, Sunnyvale, CA (US); Andrew Coulter Jaegle, London (GB); Catalina-Codruta Cangea, Cambridge (GB); Sebastian Borgeaud Dit Avocat, London (GB); Charlie Thomas Curtis Nash, London (GB); Mateusz Malinowski, London (GB); Sander Etienne Lea Dieleman, London (GB); Oriol Vinyals, London (GB); Matthew Botvinick, Philadelphia, PA (US); Ian Stuart Simon, San Francisco, CA (US); Hannah Rachel Sheahan, London (GB); Neil Zeghidour, Paris (FR); Jean-Baptiste Alayrac, London (GB); Joao Carreira, St. Albans (GB); Jesse Engel, Orinda, CA (US)

(73) Assignee: GDM Holding LLC, Mountain View, CA (US)

( * ) Notice: Subject to any disclaimer, the term of this patent is extended or adjusted under 35 U.S.C. 154(b) by 863 days.

(21) Appl. No.: 18/102,985

(22) Filed: Jan. 30, 2023

(65) Prior Publication Data

US 2023/0244907 A1 Aug. 3, 2023

Related U.S. Application Data

(60) Provisional application No. 63/304,373, filed on Jan. 28, 2022.

(51) Int. Cl.
*G06N 3/045* (2023.01)
*G06N 3/044* (2023.01)

(52) U.S. Cl.
CPC .................................... *G06N 3/044* (2023.01)

(58) Field of Classification Search
CPC ...................................................... G06N 3/044
See application file for complete search history.

(56) References Cited

U.S. PATENT DOCUMENTS 12,306,906 B2 * 5/2025 Fayyaz .................... G06N 3/04
2020/0342316 A1 * 10/2020 Shazeer ................. G06N 3/045

OTHER PUBLICATIONS

Ye, Zihao, et al. "Bp-transformer: Modelling long-range context via binary partitioning." arXiv preprint arXiv:1911.04070 (Year: 2019).*

(Continued)

*Primary Examiner* — Adam C Standke
(74) *Attorney, Agent, or Firm* — Fish & Richardson P.C.

(57) ABSTRACT

Methods, systems, and apparatus, including computer programs encoded on a computer storage medium, for generating a sequence of data elements that includes a respective data element at each position in a sequence of positions. In one aspect, a method includes: for each position after a first position in the sequence of positions: obtaining a current sequence of data element embeddings that includes a respective data element embedding of each data element at a position that precedes the current position, obtaining a sequence of latent embeddings, and processing: (i) the current sequence of data element embeddings, and (ii) the sequence of latent embeddings, using a neural network to generate the data element at the current position. The neural network includes a sequence of neural network blocks including: (i) a cross-attention block, (ii) one or more self-attention blocks, and (iii) an output block.

18 Claims, 8 Drawing Sheets

NEURAL NETWORK SYSTEM 100

(56) References Cited

OTHER PUBLICATIONS

Yang, Zhilin, et al. "XInet: Generalized autoregressive pretraining for language understanding." Advances in neural information processing systems 32 (Year: 2019).*
Suzuki, Masahiro. "Score transformer: Generating musical score from note-level representation." Proceedings of the 3rd ACM International Conference on Multimedia in Asia. (Year: 2021).*
Nambiar, Ananthan, et al. "Transforming the language of life: transformer neural networks for protein prediction tasks." Proceedings of the 11th ACM international conference on bioinformatics, computational biology and health informatics. (Year: 2020).*
International Preliminary Report on Patentability in International Appln. No. PCT/EP2023/052026, dated Jul. 30, 2024, 12 pages.
Baevski et al., "Adaptive input representations for neural language modeling," International Conference on Learning Representations, Dec. 20, 2018, 13 pages.
Bengio et al., "A neural probabilistic language model," Journal of Machine Learning Research, 2003, 19 pages.
Brown et al., "Language models are few-shot learners," CoRR, May 28, 2020, arXiv:2005.14165, 75 pages.
Chen et al., "Generative pretraining from pixels," Proceedings of the 37th International Conference on Machine Learning, 2020, 119:1691-1703.
Child et al., "Generating long sequences with sparse Transformers," CoRR, Apr. 23, 2019, arXiv:1904,10509, 10 pages.
Clark et al., "CANINE: pre-training an efficient tokenization-free encoder for language representation," CoRR, Mar. 11, 2021, arXiv:2103.06874, 18 pages.
Dai et al., "Funnel-Transformer: Filtering out sequential redundancy for efficient language processing," 34th Conference on Neural Information Processing Systems, 2020, 12 pages.
Dai et al., "Transformer-XL: Attentive Language Models Beyond a Fixed-Length Context," CoRR, Jan. 9, 2019, arXiv:1901.02860v3, 20 pages.
Dai et al., "Transformer-XL: Attentive language models beyond a fixed-length context," Proceedings of the 57th Annual Meeting of the Association for Computational Linguistics, Jul. 28, 2019, pp. 2978-2988.
Dhariwal et al., "Jukebox: A generative model for music," CoRR, Apr. 30, 2020, arXiv:2005.00341, 20 pages.
Dosovitskiy et al., "An image is worth 16x16 words: Transformers for image recognition at scale," Proceedings of the International Conference on Learning Representations, Jan. 12, 2021, 21 pages.
Fan et al., "Pay less attention with lightweight and dynamic convolutions," CoRR, Jan. 29, 2019, arXiv:1901.10430, 14 pages.
Github.com [online], "google-deepmind/optax," Mar. 23, 2021, retrieved on May 28, 2024, retrieved from URL<https://github.com/google-deepmind/optax/>, 4 pages.
Github.com [online], "kingoflolz/mesh-transformer-jax," Jun. 9, 2021, retrieved on Jul. 2, 2024, retrieved from URL<https://github.com/kingoflolz/mesh-transformer-jax/>, 5 pages.
Graves et al., "Hybrid computing using a neural network with dynamic external memory," Nature, Oct. 12, 2016, 538(7626):471-476.
Graves et al., "Neural Turing Machines," CoRR, Oct. 20, 2014, arXiv:1410.5401, 26 pages.
Graves, "Generating sequences with recurrent neural networks," CoRR, Aug. 4, 2013, arXiv:1308.0850, 43 pages.
Gu et al., "Efficiently modeling long sequences with structured state spaces," CoRR, Oct. 31, 2021, arXiv:2111.00396, 32 pages.
Harris et al., "Array programming with NumPy," Nature, 2020, 585(7825):357-362.
Hawthorne et al., "Enabling factorized piano music modeling and generation with the MAESTRO dataset," Proceedings of the International Conference on Learning Representations (ICLR), Dec. 20, 2018, 12 pages.
Hawthorne et al., "General-purpose, long-context autoregressive modeling with Perceiver AR," CoRR, Jun. 14, 2022, arXiv:2202.07765v2, 24 pages.
Hawthorne et al., "Onsets and frames: Dual-objective piano transcription," Proceedings of the 19th International Society for Music Information Retrieval Conference, 2018, 8 pages.
Hendrycks et al., "Gaussian error linear units (GELUs)," CoRR, Jun. 27, 2016, arXiv:1606.08415, 10 pages.
Huang et al., "Music Transformer: Generating music with long-term structure," Proceedings of the International Conference on Learning Representations, Dec. 12, 2018, 14 pages.
International Search Report and Written Opinion in International Appln. No. PCT/EP2023/052026, dated Mar. 20, 2023, 18 pages.
Jaegle et al., "Perceiver IO: A general architecture for structured inputs & outputs," CoRR, Jul. 30, 2021, arXiv:2107.14795, 29 pages.
Jaegle et al., "Perceiver: General Perception with Iterative Attention," CoRR, Mar. 4, 2021, arXiv:2103.03206v1, 16 pages.
Jumper et al., "Highly accurate protein structure prediction with AlphaFold," Nature, Jul. 15, 2021, 596:583-589.
Katharopoulos et al., "Transformers are RNNs: Fast Autoregressive Transformers with Linear Attention," CoRR, Aug. 31, 2020, arXiv:2006.16236v3, 17 pages.
Ke et al., "Rethinking positional encoding in language pretraining, " Proceedings of the International Conference on Learning Representations, Jan. 12, 2021, 14 pages.
Kingma et al., "Adam: A method for stochastic optimization," CoRR, Dec. 22, 2014, arxiv.org/abs/1412.6980, 15 pages.
Kingma et al., "On density estimation with diffusion models," Proceedings of Neural Information Processing Systems 34, 2021, 12 pages.
Kitaev et al., "Reformer: The efficient transformer," Proceedings of the International Conference on Learning Representations, Dec. 19, 2019, 12 pages.
Kudo et al., "SentencePiece: A simple and language independent subword tokenizer and detokenizer for neural text processing," Proceedings of the 2018 Conference on Empirical Methods in Natural Language Processing, Oct. 31, 2018, pp. 66-71.
Lakhotia et al., "Generative spoken language modeling from raw audio," CoRR, Feb. 1, 2021, arXiv:2102.01192, 20 pages.
Liu et al., "Generating Wikipedia by Summarizing Long Sequences," CoRR, Jan. 30, 2018, arXiv:1801.10198v1, 18 pages.
Ma et al., "LUNA: Linear unified nested attention," CoRR, Jun. 3, 2021, arxiv.org/abs/2106.01540, 15 pages.
Mehri et al., "SampleRNN: An unconditional end-to-end neural audio generation model," Proceedings of the International Conference on Learning Representation, Jul. 21, 2022, 11 pages.
Merity et al., "Pointer sentinel mixture models," Proceedings of the International Conference on Learning Representations, Jul. 21, 2022, 15 pages.
Nash et al., "Generating images with sparse representations," CoRR, Mar. 5, 2021, arxiv.org/abs/2103.03841, 18 pages.
Nawrot et al., "Transformers are more efficient language models," CoRR, Oct. 26, 2021, arXiv:2110.13711, 13 pages.
Peng et al., "Random feature attention," Proceedings of the International Conference on Learning Representations, Jan. 12, 2021, 19 pages.
Polyak et al., "Speech resynthesis from discrete disentangled self-supervised representations," CoRR, Apri, 1, 2021, arXiv:2104.00355, 5 pages.
Press et al., "Shortformer: Better language modeling using shorter inputs," CoRR, Dec. 31, 2020, arxiv.org/abs/2012.15832, 13 pages.
Rabe et al., "Self-attention does not need O(n2) memory," CoRR, Dec. 10, 2021, arXiv:2112.05682, 8 pages.
Rae et al., "Compressive Transformers for long-range sequence modelling," Proceedings of the International Conference on Learning Representations, Dec. 19, 2019, 19 pages.
Raffel et al., "Exploring the limits of transfer learning with a unified text-to-text Transformer," Journal of Machine Learning Research, 2020, 21:1-67.
Rajbhandari et al., "ZeRO: Memory optimizations toward training trillion parameter models," Proceedings of the International Conference for High Performance Computing, Networking, Storage and Analysis, Nov. 9-19, 2020, 16 pages.
Ramesh et al., "Zero-shot Text-to-Image generation," CoRR, Feb. 24, 2021, arXiv:2102.12092, 20 pages.

(56) References Cited

OTHER PUBLICATIONS

Ren et al., "Combiner: Full attention Transformer with sparse computation cost," Advances in Neural Information Processing Systems 34, 2021, 13 pages.
Rosenfeld et al., "Two decades of statistical language modeling: where do we go from here?," Proceedings of the IEEE, Aug. 2000, 88(8):1270-1278.
Roy et al., "Efficient content-based sparse attention with Routing Transformers," Transactions of the Association for Computational Linguistics (TACL), Feb. 1, 2021, 9:53-68.
Saharia et al., "Image super-resolution via iterative refinement," CoRR, Apr. 15, 2021, arXiv:2104.07636, 28 pages.
Schmidhuber et al., "Sequential neural text compression," IEEE Transactions on Neural Networks, Jan. 1996, 7(1):142-146.
Shazeer, "Fast Transformer decoding: one write-head is all you need," CoRR, Nov. 6, 2019, arXiv:1911.02150, 9 pages.
So et al., "Primer: Searching for efficient Transformers for language modeling," CoRR, Sep. 17, 2021, arXiv:2109.08668, 34 pages.
Srivastava et al., "Dropout: A simple way to prevent neural networks from overfitting, " Journal of Machine Learning Research (JMLR), 2014, 15:1929-1958.
Su et al., "RoFormer: Enhanced Transformer with rotary position embedding," CoRR, Apr. 20, 2021, arxiv:2104.09864, 14 pages.
Sun et al., "Do long-range language models actually use long-range context?," Proceedings of the Annual Conference on Empirical Methods in Natural Language Processing (EMNLP), Nov. 2021, pp. 807-822.
Sutskever et al., "Sequence to sequence learning with neural networks," Advances in Neural Information Processing Systems 27 (NIPS 2014), 9 pages.
Uria et al., "Neural autoregressive distribution estimation," Journal of Machine Learning Research (JMLR), 2016, 17(205):1-37.
Van den Oord et al., "Neural discrete representation learning," Advances in Neural Information Processing Systems 30 (NIPS 2017), 2017, 10 pages.
Van den Oord et al., "Pixel recurrent neural networks," Proceedings of the 33rd International Conference on Machine Learning, 2016, 48:1747-1756.
Van den Oord et al., "WaveNet: A generative model for raw audio," CoRR, Sep. 19, 2016, arXiv:1609.03499, 15 pages.
Vaswani et al., "Attention is all you need," Advances in Neural Information Processing Systems 30 (NIPS 2017), 2017, 11 pages.
Vaswani et al., "Tensor2tensor for neural machine translation," CoRR, Mar. 16, 2018, arXiv:1803.07416, 9 pages.
Vinyals et al., "Grandmaster level in StarCraft II using multi-agent reinforcement learning," Nature, 2019, 575(7782):350-354.
Wang et al., "Linformer: Self-attention with linear complexity," CoRR, Jun. 8, 2020, arXiv:2006.04768, 12 pages.
Weston et al., "Memory networks," Proceedings of the International Conference on Learning Representations (ICLR), Nov. 29, 2015, 15 pages.
Wu et al., "Memorizing transformers," International Conference on Learning Representations, Jan. 28, 2022, 19 pages.
Wu et al., "NUWA: Visual synthesis pre-training for neural visual world creation," CoRR, Nov. 24, 2021, arXiv:2111.12417, 28 pages.
Xiong et al., "On layer normalization in the Transformer architecture," Proceedings of the 37th International Conference on Machine Learning, 2020, 119:10524-10533.
Zaheer et al., "Big Bird: Transformers for longer sequences," Advances in Neural Information Processing Systems 33 (NeurIPS 2020), 2020, 15 pages.
Zeghidour et al., "SoundStream: An end-to-end neural audio codec," IEEE/ACM Transactions on Audio, Speech, and Language Processing (TASLP), Nov. 23, 2021, 30:495-507.
Zhu et al., "Long-Short Transformer: Efficient Transformers for Language and Vision," CORR, Jul. 5, 2021, arXiv:2107.02192v1, 18 pages.

* cited by examiner

NEURAL NETWORK SYSTEM IN MORE DETAIL 200

EXAMPLE CONTEXT RANGE 500

EXAMPLE EXPERIMENTAL RESULTS 700

| Model | Context length | # layers | Val ppl. | Test ppl. |
|---|---|---|---|---|
| Transformer-XL | 512+1024 | 36 | 45.5 | 36.3 |
| Compressive Transformer | 512+512+2x512 | 36 | 43.4 | 33.6 |
| Routing Transformer | 8192 | 22 | - | 33.2 |
| Perceiver AR | 2048 | 60 | 45.9 | **28.9** |
| Perceiver AR | 4096 | 60 | 45.9 | 29.0 |

FIG. 7

EXAMPLE EXPERIMENTAL RESULTS 800

| Model | MAESTRO | Test | Validation |
|---|---|---|---|
| Music Transformer | v1 | - | 1.84 |
| Perceiver AR | v1 | 1.82 | 1.82 |
| Perceiver AR | v3 | 1.91 | 1.90 |

FIG. 8A

| SoundStream bitrate | Context | Test | Validation |
|---|---|---|---|
| 12kbps | 54.4s | 2.49 | 2.34 |
| 18kbps | 36.8s | 2.60 | 2.57 |
| 22kbps | 29.6s | 2.65 | 2.62 |

FIG. 8B

GENERATING SEQUENCES OF DATA ELEMENTS USING CROSS-ATTENTION OPERATIONS

CROSS-REFERENCE TO RELATED APPLICATIONS

This application claims the benefit of the filing date of U.S. Provisional Patent Application Ser. No. 63/304,373 for “GENERATING SEQUENCES OF DATA ELEMENTS USING CROSS-ATTENTION OPERATIONS,” which was filed on Jan. 28, 2022, and which is incorporated here by reference in its entirety.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification generally describes a system implemented as computer programs on one or more computers in one or more locations that can generate a sequence of data elements using a neural network.

Throughout this specification, an embedding refers to an ordered collection of numerical values, e.g., a vector or matrix of numerical values.

A block refers to a group of one or more neural network layers in a neural network.

According to a first aspect, there is provided a method that includes: generating a sequence of data elements that includes a respective data element at each position in a sequence of positions, including, for each position after a first position in the sequence of positions: obtaining a current sequence of data element embeddings that includes a respective data element embedding of each data element at a position that precedes the current position, obtaining a sequence of latent embeddings, and processing: (i) the current sequence of data element embeddings, and (ii) the sequence of latent embeddings, using a neural network to generate the data element at the current position.

The neural network can include a sequence of neural network blocks including: (i) a cross-attention block, (ii) one or more self-attention blocks, and (iii) an output block. The cross-attention block performs operations including: updating each latent embedding in the sequence of latent embeddings using attention over the current sequence of data element embeddings. Each self-attention block performs operations including: updating each latent embedding in the sequence of latent embeddings using attention over the sequence of latent embeddings. The output block performs operations including: after the sequence of latent embeddings are updated using the cross-attention block and the one or more self-attention blocks, processing one or more latent embeddings from the sequence of latent embeddings to generate the data element at the current position.

In some implementations, updating each latent embedding in the sequence of latent embeddings using attention over the current sequence of data element embeddings includes: updating each latent embedding in the sequence of latent embeddings using masked attention over the current sequence of data element embeddings.

In some implementations, each latent embedding corresponds to a respective position in the sequence of positions, and where updating each latent embedding in the sequence of latent embeddings using masked attention over the current sequence of data element embeddings includes, for each latent embedding: updating the latent embedding using attention over only: (i) the data element embedding at the position corresponding to the latent embedding, and (ii) any data element embeddings at positions preceding the position correspond to the latent embedding.

In some implementations, updating each latent embedding in the sequence of latent embeddings using attention over the sequence of latent embeddings includes: updating each latent embedding in the sequence of latent embeddings using masked attention over the sequence of latent embeddings.

In some implementations, updating each latent embedding in the sequence of latent embeddings using masked attention over the sequence of latent embeddings includes, for each latent embedding in the sequence of latent embeddings: updating the latent embedding using attention over only: (i) the latent embedding, and (ii) any latent embeddings that precede the latent embedding in the sequence of latent embeddings.

In some implementations, for one or more positions in the sequence of positions, obtaining the sequence of latent embeddings includes: identifying a subsequence of the current sequence of data element embeddings, and determining the sequence of latent embeddings based on the subsequence of the current sequence of data element embeddings.

In some implementations, the subsequence of the current sequence of data element embeddings includes a predefined number of last data element embeddings in the sequence of data element embeddings.

In some implementations, determining the sequence of latent embeddings based on the subsequence of the current sequence of data element embeddings includes: setting the sequence of latent embeddings equal to the subsequence of the current sequence of data element embeddings.

In some implementations, generating the data element at the current position includes: processing the one or more latent embeddings from the sequence of latent embeddings to generate a score distribution over a set of possible data elements, and selecting the data element at the current position using the score distribution over the set of possible data elements.

In some implementations, selecting the data element at the current position using the score distribution over the set of possible data elements includes: sampling the data element at the current position from the set of possible data elements in accordance with the score distribution over the set of possible data elements.

In some implementations, for each of one or more positions in the sequence of positions: a number of latent embeddings in the sequence of latent embeddings is less than a number of data element embeddings in the current sequence of data element embeddings.

In some implementations, the number of latent embeddings is at least an order of magnitude less than the number of data element embeddings.

In some implementations, for each position after the first position in the sequence of positions, a number of latent embeddings in the sequence of latent embeddings is predefined and independent of a number of data element embeddings in the current sequence of data element embeddings.

In some implementations, generating the sequence of data elements comprises autoregressively generating the sequence of data elements.

In some implementations, the sequence of data elements defines an image.

In some implementations, the sequence of data elements defines an audio waveform.

In some implementations, the sequence of data elements defines a sequence of musical notes.

In some implementations, the sequence of data elements defines a structure of a protein.

In some implementations, the sequence of data elements defines a video.

According to a second aspect, there is provided a method that includes: obtaining a representation of a sequence of data elements as a sequence of data element embeddings that includes a respective data element at each input position in a sequence of input positions, obtaining a sequence of latent embeddings, where each latent embedding corresponds to a respective position in the sequence of input positions, and processing: (i) the sequence of data element embeddings, and (ii) the sequence of latent embeddings, using a neural network to generate a respective network output for each output position in a sequence of output positions. The neural network includes a sequence of neural network blocks including: (i) a cross-attention block, (ii) one or more self-attention blocks, and (iii) an output block.

The cross-attention block performs operations including: updating each latent embedding in the sequence of latent embeddings using masked attention over the sequence of data element embeddings. Each self-attention block performs operations including: updating each latent embedding in the sequence of latent embeddings using masked attention over the sequence of latent embeddings. The output block performs operations including, after the sequence of latent embeddings are updated using the cross-attention block and the one or more self-attention blocks: generating, for each output position in the sequence of output positions, the network output for the output position by processing a corresponding latent embedding from the sequence of latent embeddings.

In some implementations, updating each latent embedding in the sequence of latent embeddings using masked attention over the sequence of data element embeddings includes, for each latent embedding in the sequence of latent embeddings: updating the latent embedding using attention over only: (i) the data element embedding at the input position corresponding to the latent embedding, and (ii) any data element embeddings at input positions preceding the input position corresponding to the latent embedding.

In some implementations, updating each latent embedding in the sequence of latent embeddings using masked attention over the sequence of latent embeddings includes, for each latent embedding in the sequence of latent embeddings: updating the latent embedding using attention over only: (i) the latent embedding, and (ii) any latent embeddings that precede the latent embedding in the sequence of latent embeddings.

In some implementations, obtaining the sequence of latent embeddings includes, for each latent embedding: determining the latent embedding based on the data element embedding at the input position corresponding to the latent embedding.

In some implementations, determining the latent embedding based on the data element embedding at the input position corresponding to the latent embedding includes: setting the latent embedding equal to the data element embedding at the input position corresponding to the latent embedding.

In some implementations, for each output position in the sequence of output positions, the network output for the output position includes a score distribution over a set of possible data elements.

In some implementations, the method further includes: determining gradients of an objective function with respect to a set of neural network parameters of the neural network, and updating current values of the set of neural network parameters of the neural network using the gradients.

In some implementations, the objective function measures, for each output position in the sequence of output positions, an error between: (i) the score distribution, at the output position, over the set of possible data elements, and (ii) a target data element for the output position.

In some implementations, the error includes a cross-entropy error.

In some implementations, for each output position before a last output position in the sequence of output positions, the target data element for the output position is a data element, in the sequence of data elements, at a next input position following the input position corresponding to the latent embedding that is processed to generate the score distribution at the output position.

According to a third aspect, there is provided a system including: one or more computers, and one or more storage devices communicatively coupled to the one or more computers, where the one or more storage devices store instructions that, when executed by the one or more computers, cause the one or more computers to perform the operations of the respective method of any preceding aspect.

According to a fourth aspect, there are provided one or more non-transitory computer storage media storing instructions that when executed by one or more computers cause the one or more computers to perform the operations of the respective method of any preceding aspect.

The subject matter described in this specification can be implemented in particular embodiments so as to realize one or more of the following advantages.

The system described herein can autoregressively generate a sequence of data elements, i.e., such that each data element in the sequence is conditionally generated based on the preceding data elements in the sequence. In particular, to generate the data element at a position in the sequence, the system can instantiate a set of latent embeddings, and then process both: (i) a “current” sequence of data element embeddings that represents the data elements preceding the position, and (ii) the latent embeddings, using a neural network. The neural network can update the latent embeddings using cross-attention over the current sequence of data element embeddings, thereby enriching the latent embeddings with information from the previously generated data element embeddings. Because the number of latent embeddings can be independent of the length of the current sequence of data element embeddings, the computational complexity of the cross-attention operation is partially decoupled from the length of the current sequence of data element embeddings. Therefore, performing the cross-attention operation can remain computationally feasible even for lengthy sequences of data element embeddings, e.g., that include hundreds of thousands of data element embeddings.

In addition to performing the cross-attention operation, the neural network can update the set of latent embeddings using one or more times using self-attention operations, which can enable the neural network to share information across the set of latent embeddings and perform sophisticated implicit reasoning. The number of latent embeddings can be significantly less than the length of the current sequence of data elements (e.g., by one or more orders of magnitude), and the computational complexity of self-attention operations on the latent embeddings is independent of the length of the current sequence of data elements.

Thus the cross-attention and self-attention operations operate synergistically to enable the neural network to significantly reduce consumption of computational resources (e.g., compared to conventional systems) while generating sequences of data elements that encode complex long-range patterns. In particular, performing cross-attention (rather than, e.g., self-attention) over the sequence of data element embeddings can enable the neural network to scale up to efficiently generating very lengthy sequences of data elements, e.g., millions of data elements, representing high resolution images, video, or audio.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 7 illustrates another example of experimental results achieved using the neural network system.

FIG. 8A and FIG. 8B illustrate another example of experimental results achieved using the neural network system.

Like reference numbers and designations in the various drawings indicate like elements.

DETAILED DESCRIPTION

Figure 1:
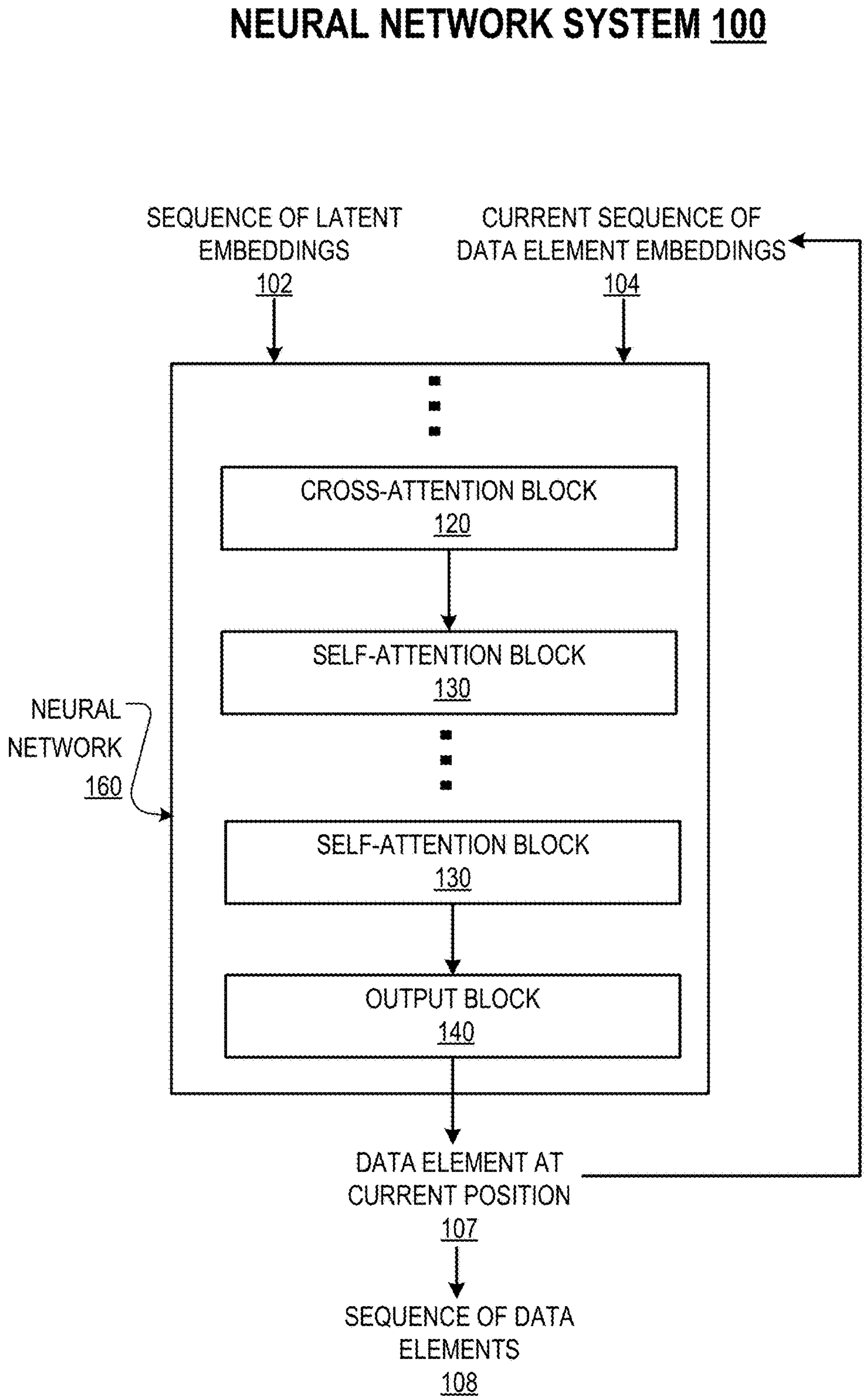
FIG. 1 is a block diagram of an example neural network system.

FIG. 1 is a block diagram of an example neural network system 100 that can generate a sequence of data elements 108 representing an entity. The neural network system 100 is an example of a system implemented as computer programs on one or more computers in one or more locations in which the systems, components, and techniques described below are implemented.

The sequence of data elements 108 representing an entity can include a respective data element at each position in the sequence of data elements 108. Generally, the sequence of data elements 108 can represent any appropriate entity, e.g., any appropriate type of data, and can include any appropriate number of data elements, e.g., 1 data element, 10 data elements, 100 data elements, 1,000 data elements, 10,000 data elements, 1 million data elements, 5 million data elements, or any other appropriate number of data elements.

In one example, each data element can represent a pixel in an image, e.g. an intensity value of the pixel, and the sequence of data elements 108 can collectively represent the image.

As another example, each data element can represent an audio sample in an audio waveform, e.g. a time or time-frequency sample, and the sequence of data elements 108 can collectively represent the audio waveform. As another example, each data element can represent a musical note, and the sequence of data elements can collectively represent a musical composition.

As another example, each data element can represent a pixel in a respective video frame of a video, e.g. an intensity value of the pixel, and the sequence of data elements can collectively represent the video.

As another example, each data element can represent a respective structure parameter from a plurality of structure parameters that collectively define a structure of a protein. For example, for each position in an amino acid sequence of the protein a corresponding data element may define a set of structure parameters that characterize a three-dimensional spatial configuration of the amino acid at the position. The set of structure parameters can comprise, e.g., torsion angles of the bonds between the amino acids in the protein, e.g. backbone torsion angles, or three-dimensional (3D) coordinates defining the positions of one or more atoms in the amino acid, e.g. nitrogen, alpha carbon, and beta carbon atoms of the protein.

As another example, each data element can represent an amino acid, and the sequence of data elements can collectively represent an amino acid sequence of a protein.

As another example, each data element can represent a character, word piece, or word, and the sequence of data elements can collectively represent a piece of text.

As another example, each data element can represent the location of a point in 3D space, e.g. in x, y, z coordinates, and the sequence of data elements can collectively represent a point cloud. The point cloud can characterize a 3D geometry of an environment, e.g., where each point in the point cloud represents a point on a surface or object in the environment.

As another example, each data element can represent an action from a set of possible actions, e.g., that can be performed by an agent interacting with an environment. The sequence of data elements can collectively represent a sequence of actions that can be performed by an agent to interact with an environment. The agent can be, e.g., a mechanical agent, e.g., a robot or a self-driving vehicle, and the environment can be a real-world environment.

Thus a task performed by the neural network system can be to generate a sequence of data elements as described above, either unconditionally, e.g. in accordance with a training distribution, or conditionally, as described further below.

The neural network system 100 can process a sequence of latent embeddings 102 and a current sequence of data element embeddings 104 to generate a data element at a current position 107. Based on the data element at the current position 107, the system 100 can generate the sequence of data elements 108 autoregressively, e.g., such that each data element in the sequence of data elements 108 is conditionally generated based on the preceding data elements in the sequence of data elements 108. For example, the neural network system 100 can conditionally generate the data element at a third position (e.g., the data element at the current position 107) in the sequence of data elements 108 based on the data elements generated previously, e.g., based on the data element at a first position and the data element at a second position in the sequence of data elements 108. After generating the data element at the third position in the sequence of data elements 108, the neural network system 100 can conditionally generate the data element at a fourth position (e.g., new current position) in the sequence of data elements 108 based on the data elements generated previously, e.g., based on the data elements at the first, second, and third positions in the sequence of data elements 108, and so on. Each time the neural network system 100 generates the data element at the current position 107, it can concatenate it onto the sequence of data elements 108. In other words, the neural network system 100 can be configured to autoregressively generate a data element at each position in the sequence of data elements 108.

Specifically, in order to generate the data element at the current position 107 in the sequence of data elements 108, the neural network system 100 can process: (i) the current sequence of data element embeddings 104, and (ii) the sequence of latent embeddings 102. The current sequence of data element embeddings 104 can include a respective data element embedding at each position that precedes the current position in the sequence of data elements 108. An "embedding" can generally refer to an ordered collection of numerical values, e.g., a vector, matrix, or other tensor of numerical values. A "data element embedding" can refer to an embedding of a data element in the sequence of data elements 108. In some cases, each data element in the sequence of data elements can be associated with a predefined data element embedding. In other words, for each data element in the sequence of data elements, the system can generate the data element embedding by mapping the data element onto the corresponding data element embedding. In some cases a latent embedding in the sequence may be combined with a respective position encoding that defines a position of the latent embedding in the sequence, e.g. a learned position encoding, a relative position encoding, or a Fourier feature-based position encoding. However this is not essential.

A "latent embedding" can refer to an embedding in a latent space. In some cases, the sequence of latent embeddings 102 can be defined based on the sequence of data element embeddings 104, e.g., based on a subsequence of the sequence of data element embeddings 104. This is described in more detail below with reference to FIG. 2. In some cases, the sequence of latent embeddings 102 can be learned by the neural network system 100, i.e., during training. Generally, the sequence of latent embeddings 102 can be obtained in any appropriate manner. In some cases, the system 100 can initialize a new sequence of latent embeddings 102 each time the system 100 generates the data element at the current position 107. For example, each time the system 100 generates the data element at the current position 107, the system 100 can obtain the sequence of latent embeddings 102 by, e.g., setting the sequence of latent embeddings 102 to default (e.g., learned) values, or setting the sequence of latent embeddings 102 to as being equal to a number of most recently processed data element embeddings in the current sequence of data element embeddings 104. The number of most recently processed data element embeddings can be any appropriate number of data element embeddings. In other words, the system 100 can use a new sequence of latent embeddings 102 each time the system 100 generates the data element at the current position 107.

In some cases, the number of latent embeddings in the sequence of latent embeddings 102 can be less than, e.g., at least an order of magnitude less than, the number of data element embeddings in the current sequence of data element embeddings 104. For example, if the current sequence of data element embeddings 104 represents an image having dimensions 224×224 pixels, and the number of data element embeddings in the current sequence of data element embeddings 104 is M=50176, then the number of latent embeddings in the sequence of latent embeddings 102 can be, e.g., N=512, such that N<<M. In some cases, the number of latent embeddings in the sequence of latent embeddings 102 can be predefined and independent of the number of data element embeddings in the current sequence of data element embeddings 104.

In order to generate the data element at the current position 107 in the sequence of data elements 108, the neural network system 100 can process: (i) the current sequence of data element embeddings 104, and (ii) the sequence of latent embeddings 102, using a neural network 160 that includes a sequence of neural network blocks. A "neural network block" can generally refer to a group of one or more neural network layers in a neural network. The sequence of neural network blocks of the neural network 160 can include: (i) a cross-attention block 120, (ii) one or more self-attention blocks 130, and (iii) an output block 140. A self-attention block, or cross-attention block, is in general a block that includes an attention mechanism, specifically a self-attention or cross-attention mechanism respectively. There are many different types of attention mechanisms that may be used. In one example, as illustrated in FIG. 1, the sequence of neural network blocks can include a first cross-attention block 120, followed by a first self-attention block 130, followed by a second self-attention block 130, followed by an output block 140. Generally, the neural network 160 can include any appropriate number of neural network blocks, e.g., 5 blocks, 10 blocks, 15 blocks, 50 blocks, 100 blocks, or any other appropriate number of neural network blocks. Furthermore, the neural network blocks can be arranged in any appropriate sequence and/or configuration in the neural network 160. In some cases, the cross-attention blocks 120 and the self-attention blocks 130 can be interleaved. The neural network system 100 can use the sequence of neural network blocks to process the current sequence of data element embeddings 104 and the sequence of latent embeddings 102 to generate the data element at the current position 107 in the sequence of data elements 108.

The attention blocks (e.g., the cross-attention block 120 and the self-attention block 130) can be configured to perform an attention operation, e.g., by updating each embedding in a first sequence of embeddings using attention over a second sequence of embeddings. In general updating a first sequence of embeddings using attention over a second sequence of embeddings refers to updating the first sequence of embeddings by applying an attention mechanism over the second sequence of embeddings; there are many different possible attention mechanisms that can be used. For example, for each target embedding in the first sequence of embeddings, each attention block can generate a respective attention weight for each embedding in the second sequence of embeddings, and generate a combined embedding based on the second sequence of embeddings and the corresponding attention weights. As a particular example, each attention block can generate the combined embedding as a weighted sum of the second sequence of embeddings, e.g., by multiplying each embedding in the second sequence of embeddings with the corresponding weight and summing the weighted embeddings. Each attention block can then use the combined embedding to update the target embedding in the first sequence of embeddings, e.g., by replacing the target embedding with the combined embedding, adding the combined embedding to the target embedding, or in any other appropriate manner.

In some implementations, the attention blocks can perform a query-key-value (QKV) attention operation, e.g., update each embedding in the first sequence of embeddings using attention over the second sequence of embeddings using query (Q), key (K), and value (V) embeddings. In particular, each attention block can include: (i) a query sub-network, (ii) a key sub-network, and (iii) a value sub-network. For each target embedding in the first sequence of embeddings, the query sub-network can be configured to process the target embedding in the first sequence of embeddings to generate a respective query embedding (Q) for the target embedding. The key sub-network can be configured to process each embedding in the second sequence of embeddings to generate a respective key embedding (K) for each embedding in the second sequence of embeddings. Similarly, the value sub-network can be configured to process each embedding in the second sequence of embeddings to generate a respective value embedding (V) for each embedding in the second sequence of embeddings.

Each attention block can then use the query embeddings (Q), the key embeddings (K), and the value embeddings (V), to update each target embedding in the first sequence of embeddings over the second sequence of embeddings. Specifically, each attention block can generate the attention weight for each embedding in the second sequence of embeddings, e.g., as an inner (e.g., dot) product of the query embedding (Q) with each of the key embeddings (K). Based on the second sequence of embeddings and the attention weights, each attention block can generate the combined embedding, e.g., as a linear combination of the value embeddings (V) weighted by their respective attention weights. Lastly, each attention block can update the target embedding in the first sequence of embeddings using the combined embedding, e.g., by replacing the target embedding in the first sequence of embeddings with the weighted sum of the value embeddings (V).

In some implementations, the attention blocks can perform a masked attention operation by updating each embedding in the first sequence of embeddings using masked attention over the second sequence of embeddings. Generally, "masking" a part of a dataset can refer to modifying the dataset to remove some or all of the information content represented by the part of the dataset, e.g., by replacing the part of dataset by default (e.g., predefined or random) values, or by removing the part of the dataset. In some cases, each position in the first sequence of embeddings can correspond to a respective position in the second sequence of embeddings. A "masked" attention operation can refer to an attention operation that updates the embedding at each position in the first sequence of embeddings using attention over only the embedding at the same position in the second sequence of embeddings and/or one or more embeddings at preceding positions in the second sequence of embeddings. That is the attention may be causally masked, so that it is only over earlier embeddings in the sequence. As described above, the attention operation can be performed by computing attention weights. In some cases, the masked attention operation can include computing attention weights for each embedding in the second sequence of embeddings. Then, for each embedding in the first sequence of embeddings, the masked attention operation can include modifying attention weights for embeddings in the second sequence at positions that are after the position that corresponds to the embedding in the first sequence of embeddings that is being updated. The system can modify an attention weight, e.g., by setting the weight value to zero, or in any other appropriate manner.

As described above, the neural network system 100 can use cross-attention and self-attention operations to autoregressively generate the sequence of data elements 108, e.g., to generate the data element at the current position 107, concatenate it to the current sequence of data elements 108, and then use the current sequence of data elements 108 to generate the data element at the next position in the sequence 108. Masked attention operation can enable the system 100 to generate the data element at the current position 107 without relying on the data elements at the succeeding positions in the sequence of data elements 108 (e.g., during training). Thus the masked attention operation enables the neural network to generate the data element at the current position 107 using operations that depend only on the data elements at the preceding positions in the sequence 108.

In some implementations, the first sequence of embeddings and the second sequence of embeddings can be different sequences of embeddings. In such cases, the attention operation (e.g., the QKV attention operation and the masked attention operation) can be referred to as a "cross-attention" operation. The cross-attention operation can be performed by, e.g., the cross-attention block 120. For example, the first sequence of embeddings can be the sequence of latent embeddings 102, the second sequence of embeddings can be the current sequence of data element embeddings 104, and the cross-attention block 120 can update each latent embedding using cross-attention over the current sequence of data element embeddings 104.

In some cases, each position in the sequence of latent embeddings 102 can correspond to a respective position in the sequence of data element embeddings 104. The cross-attention block 120 can perform the masked attention operation, e.g., as described above. That is, the cross-attention block 120 can update each latent embedding in the sequence of latent embeddings 102 using masked attention over the current sequence of data element embeddings 104. As a particular example, for each latent embedding, the cross-attention block 120 can update the latent embedding using attention over only: (i) the data element embedding at the position corresponding to the latent embedding, and (ii) any data element embeddings at positions preceding the position correspond to the latent embedding.

In some implementations, the first sequence of embeddings and the second sequence of embeddings can be the same sequence of embeddings. In such cases, the attention operation (e.g., the QKV attention operation and the masked attention operation) can be referred to as a "self-attention" operation. The self-attention operation can be performed by, e.g., the self-attention block 130. For example, the first sequence of embeddings can be the sequence of latent embeddings 102, the second sequence of embeddings can also be the sequence of latent embeddings, and the self-attention block 130 can update each latent embedding in the sequence of latent embeddings 102 using self-attention over the sequence of latent embeddings. In some implementations, the self-attention block 130 can repeatedly update each latent embedding in the sequence of latent embeddings using self-attention over the sequence of latent embeddings.

In some cases, the self-attention block 120 can perform the masked attention operation e.g., as described above. That is, the self-attention block 130 can update each latent embedding in the sequence of latent embeddings 102 using masked attention over the sequence of latent embeddings. As a particular example, for each latent embedding, the self-attention block 130 can update the latent embedding using attention over only: (i) the latent embedding, and (ii) any latent embeddings that precede the latent embedding in the sequence of latent embeddings.

The example of masked attention described above is provided for illustrative purposes only. The masked attention operation is described in more detail below with reference to FIG. 2. In some cases, the neural network system 100 can use the attention blocks to perform other types of attention operations, e.g., attention operations other than the masked attention operation, e.g., the QKV attention operation described above, or any other type of attention operation.

In some implementations, the cross-attention block 120 and the self-attention block 130 can be configured to perform other operations in addition to the attention operation described above. For example, in addition to implementing one or more attention neural network layers, the attention blocks can also include any other neural network layers (e.g., convolutional layers, fully connected layers, recurrent layers, attention layers, etc.) in any appropriate numbers (e.g., 2 layers, 5 layers, or 10 layers) and connected in any appropriate configuration (e.g., as a linear sequence of layers).

In addition to the attention blocks, the neural network 160 can further include the output block 140. During inference, the output block 140 can be configured to generate the data element embedding at the current position 107 in the sequence of data elements 108. In some cases, during training of the neural network 160, the output block 140 can be configured to generate an output (e.g., a score distribution, as described in more detail below) for each output position in a sequence of output positions.

Specifically, during inference, the output block 140 can process an output from the last attention block in the sequence of attention blocks, e.g., one or more latent embeddings from the sequence of latent embeddings, to generate the data element at the current position 107 in the sequence of data elements 108. For example, the output block 140 can process one or more latent embeddings from the sequence of latent embeddings using one or more neural network layers included in the output block 140 to generate a score distribution over a set of possible data elements. The score distribution can define, e.g., a respective score for each data element in the set of possible data elements. Then, the output block 140 can select the data element at the current position 107 using the score distribution, e.g., by sampling the data element from the set of possible data elements in accordance with the score distribution. The set of possible data elements can be any appropriate set of data elements, e.g., a set of possible audio samples, a set of possible phonemes or graphemes, a set of possible characters or word fragments or words, a set of possible protein structure parameters, or any other appropriate set of data elements.

During training, the output block 140 can be configured to generate, for each output position in the sequence of output positions, the network output for the output position by processing a corresponding latent embedding from the sequence of latent embeddings. In other words, the output block 140 can process the latent embedding at a position in the sequence of latent embeddings, to generate the network output (e.g., the score distribution over the set of possible data elements) at the corresponding position in the sequence of output positions. Then, the system 100 can use the score distributions generated for each output position in the sequence of output positions to train the neural network 160. This is described in more detail below.

As described above, the neural network system 100 can use cross-attention and self-attention operations to autoregressively generate the sequence of data elements 108. The cross-attention and self-attention operations can operate synergistically to enable the neural network system 100 to significantly reduce consumption of computational resources (e.g., compared to conventional systems) while generating sequences of data elements 108 that encode complex long-range patterns. In particular, performing cross-attention (rather than, e.g., self-attention) over the sequence of data element embeddings 104 can enable the neural network system 100 to scale up to efficiently generating very lengthy sequences of data elements 108, e.g., millions of data elements, representing high resolution images, video, or audio.

Generally, the neural network 160 can have any appropriate neural network architecture that enables it to perform its prescribed function. For example, the neural network 160, and each of the cross attention block 120, the self-attention block 130, and the output block 140, can have any appropriate neural network layers (e.g., convolutional layers, fully connected layers, recurrent layers, attention layers, etc.) in any appropriate numbers (e.g., 2 layers, 5 layers, or 10 layers) and connected in any appropriate configuration (e.g., as a linear sequence of layers). The neural network system 100 can also additionally include any number of neural network blocks configured to perform any appropriate operation.

Generally, the attention blocks can be arranged in any appropriate configuration. For example, the system 100 can include a sequence of attention blocks having two cross-attention blocks 120, followed by two self-attention blocks 130, followed by two cross-attention blocks 120. In another example, the system 100 can include a sequence of attention blocks having one cross-attention block 120 followed by multiple self-attention blocks 130. Generally, the system 100 can include any number of attention blocks 120, 130 (e.g., 5, 10, 100, etc.) arranged in any appropriate configuration.

As described above, the neural network 160 can autoregressively generate the sequence of data elements 108, i.e., such that each data element in the sequence 108 is conditionally generated based on the preceding data elements in the sequence 108. In some implementations, the neural network 160 can be conditioned on data that specifies one or more desired characteristics of sequence of data elements 108 to be generated by the neural network 160. Where the neural network is not conditioned in this way it can be used to obtain an example of a sequence of data elements from the training distribution i.e. from the distribution of a set of training examples used to train the neural network, e.g. another image or sound like those the system has been trained on, or a protein or DNA sequence with properties similar to others that the system has been trained on. Thus it is not necessary for the neural network to be conditioned on data that specifies desired characteristics of sequence.

Generally, "conditioning" a neural network can refer to providing conditioning data to the neural network as an input, such that the neural network jointly processes the conditioning data together with any other neural network inputs, e.g., the sequence of latent embeddings and the current sequence of data element embeddings. Generally, the conditioning data can be processed by the neural network in any appropriate manner, e.g., it can be processed as an additional input by one or more attention blocks in sequence of neural network blocks. A few examples of conditioning data are described next.

In one example, the conditioning data can characterize a sequence of text, and when conditioned on the conditioning data, the neural network can generate a sequence of data elements that represents a verbalization of the sequence of text, e.g. where each data element represents an audio sample in an audio waveform. Thus the system can perform a text-to-speech conversion task. Also or instead the conditioning data can identify a desired speaker for the audio, i.e., so that the system generates audio data that represents speech by the desired speaker. As another example the conditioning data can specify a classification for the audio waveform into a class from a set of possible classes, so that the system generates audio data that belongs to the class, e.g. a musical genre or instrument.

As another example, the conditioning data can define a set of properties of a protein (e.g., stability, solubility, etc.), and when conditioned on the conditioning data, the neural network can generate data defining a protein that is predicted to have the properties specified by the conditioning data. As some other examples, the conditioning data can specify a gene to be activated by a DNA sequence, or a regulatory property of the DNA sequence or protein, or a target binding site for the DNA sequence or protein. The data defining the protein can be, e.g. a protein structure or an amino acid sequence as described above. Such as system can be trained from real-world experimental data. The DNA sequence e.g. protein may then be physically synthesized.

As another example, the conditioning data can specify one or more features of an image (e.g., an object to be shown in the image and optionally its location), and when conditioned on the conditioning data, the neural network can generate an image having the features specified by the conditioning data. Thus, the conditioning data can specify a classification for the image or part of the image into a class from a set of possible classes, so that the system generates an image or image part that belongs to the class. As another example, the conditioning data can specify the location of an object to be included in a generated image (which need not involve specifying the object). As another example the conditioning data can be a sequence of text and the output data item can be an image that describes the text, i.e., the conditioning input can be a caption for the output image.

As another example, the conditioning data can specify one or more features of a point cloud (e.g., an object characterized by the point cloud), and when conditioned on the conditioning data, the neural network can generate a point cloud having the features specified by the conditioning data. Examples of conditioning data used for point cloud generation are as those described above for image generation.

As another example, the conditioning data can specify one or more features of a sequence of text (e.g., a topic of the sequence of text), and when conditioned on the conditioning data, the neural network can generate a sequence of text having the features specified by the conditioning data.

The neural network system 100 can further include a training engine that can train the neural network 160 on a set of training data over multiple training iterations. The training data can include a set of training examples, where each training example specifies: (i) a training input, and (ii) a target output that should be generated by the neural network 160 by processing the training input.

At each training iteration, the training engine can sample a batch of training examples from the training data, and process the training inputs specified by the training examples using the sequence of neural network blocks included in the neural network 160 to generate corresponding network outputs. In particular, for each training input, the neural network 160 processes the training input using the current model parameter values of a first attention block in the sequence (e.g., the cross-attention block 120 in FIG. 1) to generate an output from the first attention block. The neural network 160 processes the output generated by the first attention block in the sequence using the current model parameter values of a second attention block in the sequence (e.g., the self-attention block 130 in FIG. 1) to generate an output from the second attention block in the sequence. The neural network 160 processes an output generated by the last attention block in the sequence (e.g., the self-attention block 130 in FIG. 1) using the current model parameter values of the output block 140 to generate the network output corresponding to the training input.

The training engine can adjust the model parameter values of the attention blocks 120, 130 and the output block 140, to optimize an objective function that measures a similarity between: (i) the network outputs generated by the neural network 160, and (ii) the target network outputs specified by the training examples. The objective function can be, e.g., a cross-entropy objective function, a squared-error objective function, or any other appropriate objective function.

The training engine can determine gradients of the objective function, e.g., using backpropagation techniques. The training engine can update the model parameter values of the attention blocks 120, 130 and the output block 140 using the gradients, e.g., using any appropriate gradient descent optimization algorithm, e.g., Adam. The training engine can determine a performance measure of the neural network 160 on a set of validation data that is not used during training of the neural network 160. After training, the neural network system 100 can be used to perform a machine learning task, e.g., to generate a sequence of data elements 108. An example process for training the neural network 160 is described in more detail below with reference to FIG. 4.

The neural network system 100 is described in more detail below with reference to FIG. 2.

Figure 2:
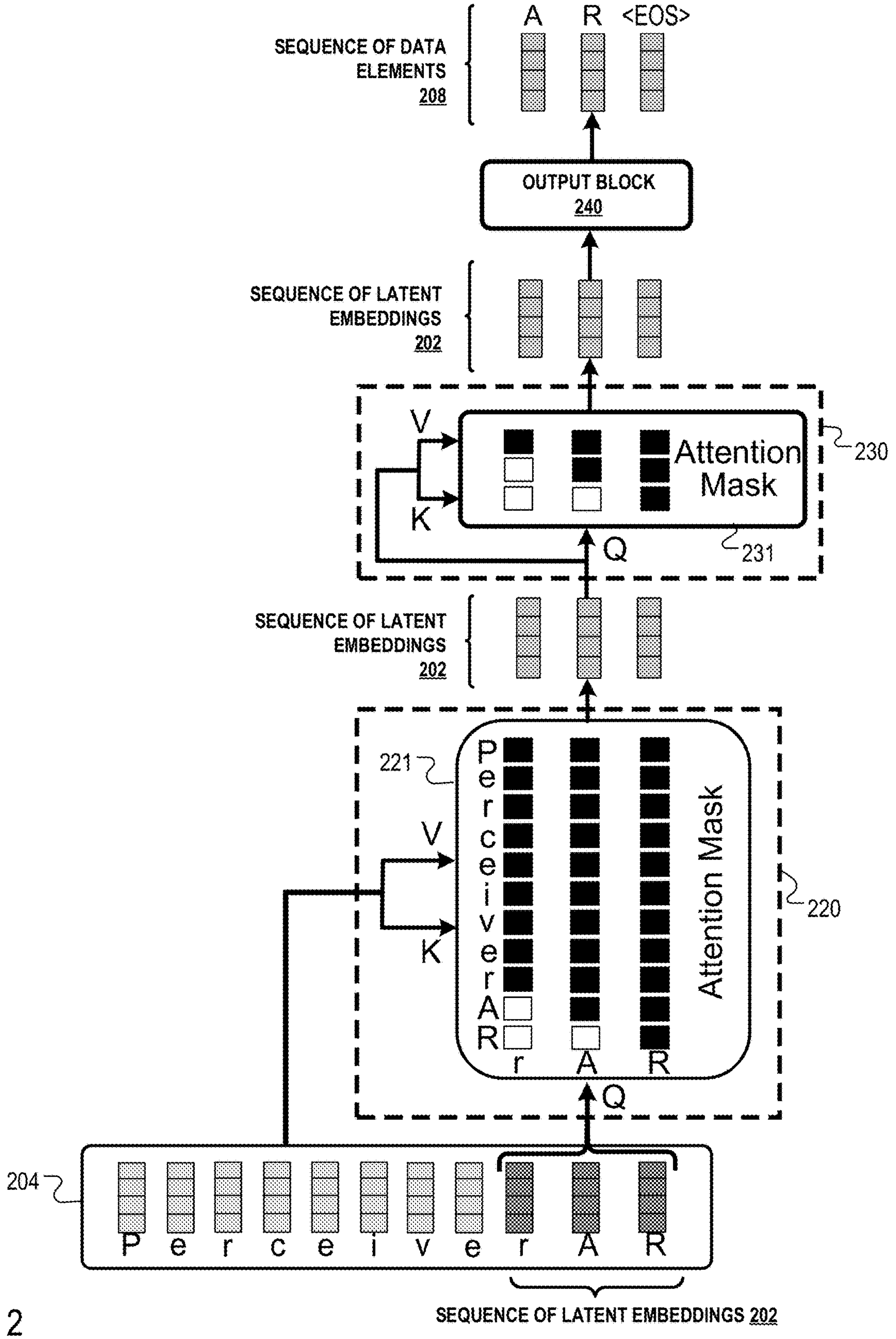
FIG. 2 is a block diagram of the example neural network system in more detail.

FIG. 2 is a block diagram of an example neural network system 200 (e.g., the neural network system 100 in FIG. 1) in more detail. The neural network system 200 is an example of a system implemented as computer programs on one or more computers in one or more locations in which the systems, components, and techniques described below are implemented.

The neural network system 200 can include a sequence of neural network blocks, e.g., one or more attention blocks and an output block. A particular example is illustrated in FIG. 2, where the neural network system 200 includes a cross-attention block 220, followed by a self-attention block 230, followed by an output block 240. As described above with reference to FIG. 1, the neural network system 200 can obtain a current sequence of data element embeddings 204 and a sequence of latent embeddings 202. The system 200 can use the sequence of neural network blocks to process the current sequence of data element embeddings 204 and the sequence of latent embeddings 202 to generate a sequence of data elements 208.

As illustrated in FIG. 2, the current sequence of data element embeddings 204 represents a word ("PerceiverAR"), with each data element embedding representing a letter at a respective position in the word. The system 200 can obtain the current sequence of data element embeddings 204 that includes a respective data element embedding of each data element at a position that precedes the current position, e.g., the current position can be the position in the sequence that follows the position of letter "R."

As illustrated in FIG. 2, the sequence of latent embeddings 202 can be defined based on the current sequence of data element embeddings 204. Specifically, the system 200 can obtain the sequence of latent embeddings 202 by identifying a subsequence of the current sequence of data element embeddings 204. In some cases, the system 200 can identify a predefined number of last data element embeddings in the sequence of data element embeddings 204. For example, as illustrated in FIG. 2, the system 200 can identify the subsequence as the data element embeddings at the last three positions in the sequence of data element embeddings 204 (e.g., "r," "A," and "R"). Generally, the system 200 can identify the subsequence of the current sequence of data element embeddings 204 in any appropriate manner, e.g., the subsequence can include any appropriate number of data element embeddings. After identifying the subsequence of the current sequence of data element embeddings 204, the system 200 can set the sequence of latent embeddings 202 to the subsequence, e.g., such that the sequence of latent embeddings 202 includes data element embeddings that represent letters "r," "A," and "R."

The cross-attention block 220 can update each latent embedding in the sequence of latent embeddings 202 using masked attention 221 over the current sequence of data element embeddings 204. Specifically, the cross-attention block 220 can update each latent embedding using attention over only: (i) the data element embedding at the position corresponding to the latent embedding, and (ii) any data element embeddings at positions preceding the position correspond to the latent embedding. For example, as illustrated in FIG. 2, the cross-attention block 220 can update the latent embedding in the sequence of latent embeddings 202 that represents letter "r" using attention over only the data element embedding at the position corresponding to the latent embedding that represents letter "r," and any data element embeddings at positions preceding the position correspond to the latent embedding that represents letter "r." These data element embeddings are shown as filled black squares spelling the word "Perceiver" in the attention mask 221 in FIG. 2. By contrast, the data element embeddings that are not used to update the latent embedding in the sequence of latent embeddings 202 are shown by empty squares in the attention mask 221 in FIG. 2.

Similarly, the cross-attention block 220 can update the latent embedding in the sequence of latent embeddings 202 that represents letter "A" using attention over only the data element embedding at the position corresponding to the latent embedding that represents letter "A," and any data element embeddings at positions preceding the position correspond to the latent embedding that represents letter "A." These data element embeddings are shown as filled squares spelling the word "PerceiverA" in the attention mask 221 in FIG. 2.

The self-attention block 230 can update each latent embedding in the sequence of latent embeddings 202 using masked attention 231 over the sequence of latent embeddings 202. Specifically, the self-attention block 230 can update each latent embedding using attention over only: (i) the latent embedding, and (ii) any latent embeddings that precede the latent embedding in the sequence of latent embeddings 202. For example, as illustrated in FIG. 2, the self-attention block 230 can update the latent embedding in the sequence of latent embeddings 202 that represents letter "r" using attention over only the latent embedding that represents letter "r" (shown as a black filled square in the attention mask 231 in FIG. 2). Similarly, the self-attention block 230 can update the latent embedding in the sequence of latent embeddings 202 that represents letter "A" using attention over the latent embedding that represents letter "A" and the latent embedding that represents letter "r" (e.g., the preceding latent embedding). The latent embeddings that are not used to update the latent embeddings in the sequence 202 are shown by empty squares in the attention mask 231 in FIG. 2.

After the sequence of latent embeddings 202 are updated using the cross-attention block 220 and the self-attention block 230, the system can provide the output from the last attention block (e.g., the self-attention block 230) to the output block 240. The output block 240 can process one or more latent embeddings from the sequence of latent embeddings 202 to generate the data element at the current position in the sequence of data elements 208. As illustrated in FIG. 2, at the current position, e.g., the position in the sequence 208 that follows the position of the letter "R," the output block 240 generates an end-of-sequence symbol "EOS." In some cases, the output block 240 can generate, for each output position in the sequence of output positions, a network output for the output position by processing a corresponding latent embedding from the sequence of latent embeddings. For example, as illustrated in FIG. 2, the output block 240 can process the first latent embedding in the sequence of latent embeddings 202 to generate a score distribution over a set of possible data elements for the first output position. Similarly, the output block 240 can process the second latent embedding in the sequence of latent embeddings 202 to generate a score distribution over a set of possible data elements for the second output position. Further, the output block 240 can process the last latent embedding in the sequence of latent embeddings 202 to generate a score distribution over a set of possible data elements for the last output position.

An example process for using the neural network system 200 to generate the sequence of data elements 208 is described in more detail next.

Figure 3:
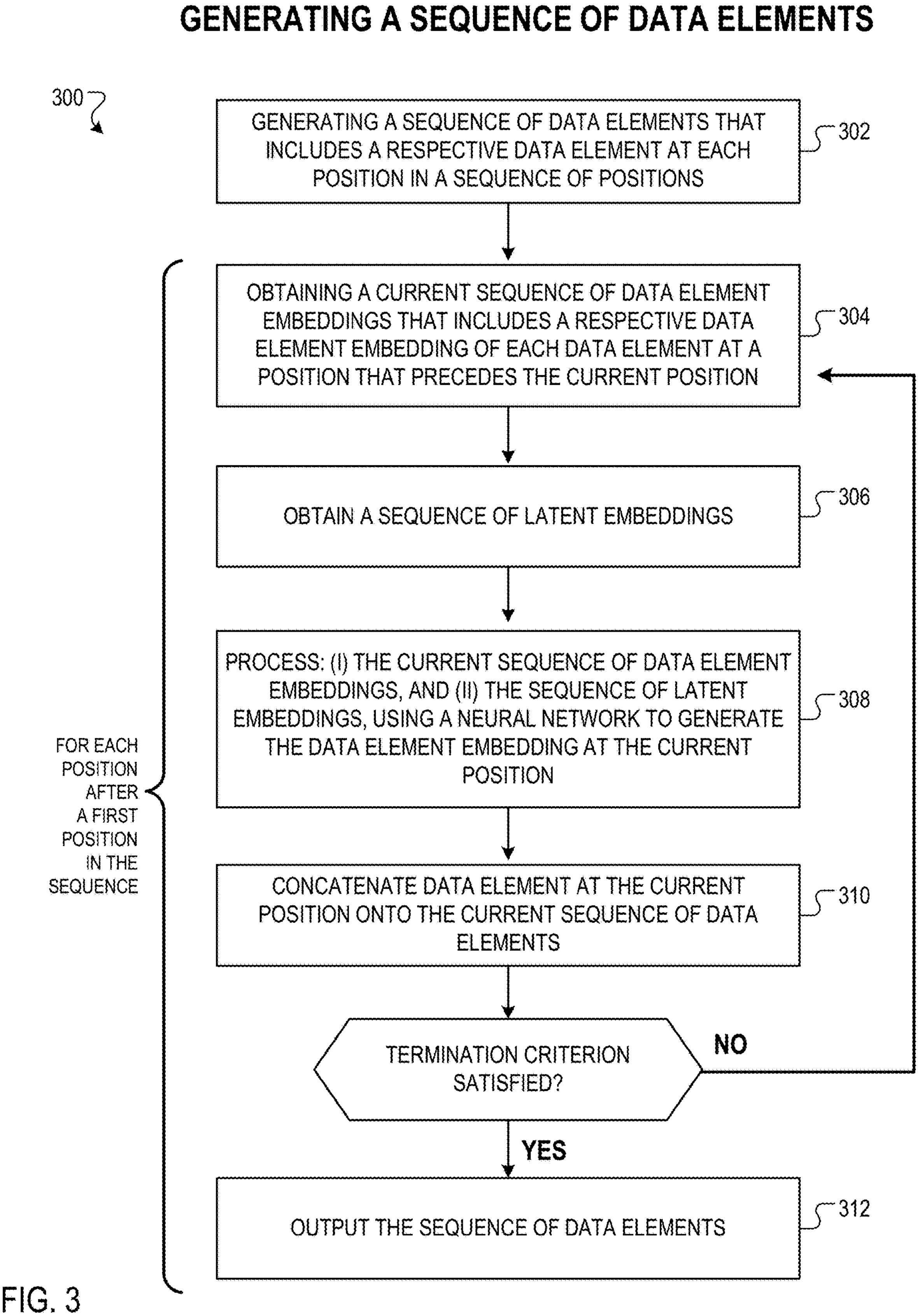
FIG. 3 is a flow diagram of an example process for using a neural network to generate a sequence of data elements.

FIG. 3 is a flow diagram of an example process 300 for using a neural network to iteratively generate a sequence of data elements. For convenience, the process 300 is described as being performed by a system of one or more computers located in one or more locations. For example, a neural network system, e.g., the neural network system 100 of FIG. 1, or the neural network system 200 of FIG. 2, appropriately programmed in accordance with this specification, can perform the process 300.

The system generates a sequence of data elements that includes a respective data element at each position in a sequence of positions (302). The sequence of data elements can define, e.g., an image, an audio waveform, a sequence of musical notes, a structure of a protein, or a video. In some cases, the system can generate the sequence of data elements autoregressively, e.g., as described above with reference to FIG. 1.

For each position after a first position in the sequence of positions, the system obtains a current sequence of data element embeddings that includes a respective data element embedding of each data element at a position that precedes the current position (304), and a sequence of latent embeddings (306). In some cases, the number of latent embeddings in the sequence of latent embeddings can be less than the number of data element embeddings in the current sequence of data element embeddings, e.g., at least an order of magnitude less than the number of data element embeddings. In some cases, for each position after the first position in the sequence of positions, the number of latent embeddings in the sequence of latent embeddings can be predefined and independent of the number of data element embeddings in the current sequence of data element embeddings.

For one or more positions in the sequence of positions, the system can obtain the sequence of latent embeddings by, e.g., identifying a subsequence of the current sequence of data element embeddings. The subsequence can include, e.g., a predefined number of last data element embeddings in the sequence of data element embeddings. The system can determine the sequence of latent embeddings based on the subsequence of the current sequence of data element embeddings by, e.g., setting the sequence of latent embeddings equal to the subsequence of the current sequence of data element embeddings.

The system processes: (i) the current sequence of data element embeddings, and (ii) the sequence of latent embeddings, using a neural network to generate the data element at the current position (308). As described above with reference to FIG. 1 and FIG. 2, the neural network can include a sequence of neural network blocks including: (i) a cross-attention block, (ii) one or more self-attention blocks, and (iii) an output block.

The cross-attention block can perform operations including: updating each latent embedding in the sequence of latent embeddings using attention over the current sequence of data element embeddings. In some implementations, the cross-attention block can update each latent embedding in the sequence of latent embeddings using masked attention over the current sequence of data element embeddings. In some cases, each latent embedding can correspond to a respective position in the sequence of positions. In such, cases, the cross-attention block can update each latent embedding using attention over only: (i) the data element embedding at the position corresponding to the latent embedding, and (ii) any data element embeddings at positions preceding the position correspond to the latent embedding.

Each self-attention block can perform operations including: updating each latent embedding in the sequence of latent embeddings using attention over the sequence of latent embeddings. In some implementations, the self-attention block can update each latent embedding in the sequence of latent embeddings using masked attention over the sequence of latent embeddings. For example, for each latent embedding, the self-attention block can update the latent embedding using attention over only: (i) the latent embedding, and (ii) any latent embeddings that precede the latent embedding in the sequence of latent embeddings.

The output block can perform operations including: after the sequence of latent embeddings are updated using the cross-attention block and the one or more self-attention blocks, processing one or more latent embeddings from the sequence of latent embeddings to generate the data element at the current position. For example, the output block can process the one or more latent embeddings from the sequence of latent embeddings to generate a score distribution over a set of possible data elements. Then, the output block can select the data element at the current position using the score distribution over the set of possible data elements, e.g., sample the data element at the current position from the set of possible data elements in accordance with the score distribution. In some cases, the output block can select the data element embedding having the highest score.

After generating the data element embedding at the current position, the system can concatenate the data element embedding at the current position onto the current sequence of data elements (310). The system can determine whether a termination criterion is satisfied. The termination criterion can be any appropriate termination criterion, e.g., the system can generate an end-of-sequence token (e.g., "EOS" in FIG. 2) indicating a termination of the process. If the system determines that the termination criterion is satisfied, the system can output the final sequence of data elements (312). However, if the system determines that the termination criterion is not satisfied, the system can return to obtaining a current sequence of data element embeddings (304). In this case, the system can generate the current sequence of data element embeddings based on the sequence of data elements that includes the data element embedding at the current position generated at the previous iteration.

An example process for training the neural network to generate a network output is described in more detail next with reference to FIG. 4.

Figure 4:
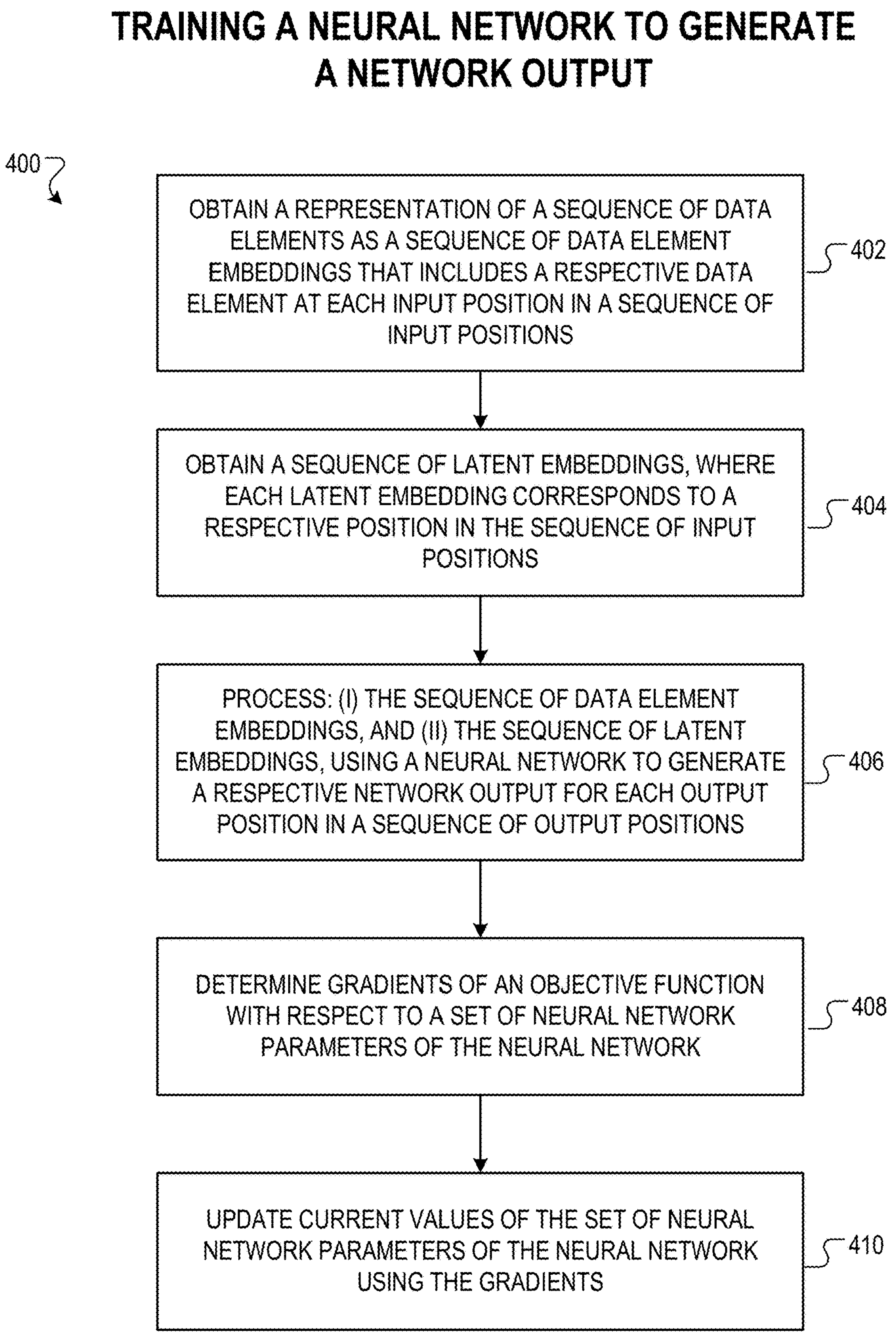
FIG. 4 is a flow diagram of an example process for training a neural network to generate a network output.

FIG. 4 is a flow diagram of an example process 400 for training a neural network to generate a network output. For convenience, the process 400 is described as being performed by a system of one or more computers located in one or more locations. For example, a neural network system, e.g., the neural network system 100 of FIG. 1, or the neural network system 200 of FIG. 2, appropriately programmed in accordance with this specification, can perform the process 400.

As described above with reference to FIG. 1, the system can include a training engine that can train the neural network on a set of training data over multiple training iterations. The training data can include a set of training examples, where each training example specifies: (i) a training input, and (ii) a target output that should be generated by the neural network by processing the training input. The training input can include, e.g., a representation of a sequence of data elements as a sequence of data element embeddings that includes a respective data element at each input position in a sequence of input positions. The target output can include, e.g., a target data element for each output position in a sequence of output positions. The process steps (402)-(410) described below provide an example process for training the neural network on a single training example from the set of training examples.

At each training iteration, the system can obtain a representation of a sequence of data elements as a sequence of data element embeddings (402), and a sequence of latent embeddings (404). In some cases, for each latent embedding, the system can determine the latent embedding based on the data element embedding at the input position corresponding to the latent embedding, e.g., by setting the latent embedding equal to the data element embedding at the input position corresponding to the latent embedding. With reference to FIG. 2, the system can, e.g., set the latent embedding at the eleventh (e.g., last) input position equal to the data element embedding that represents the letter "R" at the eleventh (e.g., last) input position.

At each training iteration, the system can process: (i) the sequence of data element embeddings, and (ii) the sequence of latent embeddings, using the neural network to generate a respective network output for each output position in a sequence of output positions (406). As described above with reference to FIG. 1, the neural network can include a sequence of neural network blocks including: (i) a cross-attention block, (ii) one or more self-attention blocks, and (iii) an output block.

The cross-attention block can update each latent embedding in the sequence of latent embeddings using masked attention over the sequence of data element embeddings. For example, as described above with reference to FIG. 1 and FIG. 2, each cross-attention block can update the latent embedding using attention over only: (i) the data element embedding at the input position corresponding to the latent embedding, and (ii) any data element embeddings at input positions preceding the input position corresponding to the latent embedding. Similarly, each self-attention block can update each latent embedding in the sequence of latent embeddings using masked attention over the sequence of latent embeddings. For example, as described above with reference to FIG. 1 and FIG. 2, each self-attention block can update the latent embedding using attention over only: (i) the latent embedding, and (ii) any latent embeddings that precede the latent embedding in the sequence of latent embeddings.

After the sequence of latent embeddings are updated using the cross-attention block and the one or more self-attention blocks, the output block can generate, for each output position in the sequence of output positions, the network output for the output position by processing a corresponding latent embedding from the sequence of latent embeddings. For each output position in the sequence of output positions, the network output for the output position can include a score distribution over a set of possible data elements. The output block can, e.g., select the network output for the output position using the score distribution over the set of possible data elements.

At each training iteration, the system can determine gradients of an objective function with respect to a set of neural network parameters of the neural network (408), e.g., using backpropagation techniques. The objective function can measure, for each output position in the sequence of output positions, an error (e.g., a cross-entropy error) between: (i) the score distribution, at the output position, over the set of possible data elements, and (ii) a target data element for the output position (e.g., specified by the training example).

At each training iteration, the system can update current values of the set of neural network parameters of the neural network using the gradients (410), e.g., using any appropriate gradient descent optimization algorithm, e.g., Adam. The system can determine a performance measure of the neural network on a set of validation data that is not used during training of the neural network. After training, the system can be used to perform a machine learning task, e.g., to generate a sequence of data elements.

In some cases, the target data element for each output position can be a data element, in the sequence of data elements, at a next input position following the input position corresponding to the latent embedding that is processed to generate the score distribution at the output position. For instance, referring to the example in FIG. 2, the target data element for a first position in the sequence of output positions is "A", and the target data element for a second position in the sequence of output positions is "R", and the target element for a third position in the sequence of output positions is "<EOS>".

An example attention operation performed by the neural network system described in this specification, and other available systems, is described in more detail below with reference to FIG. 5.

Figure 5:
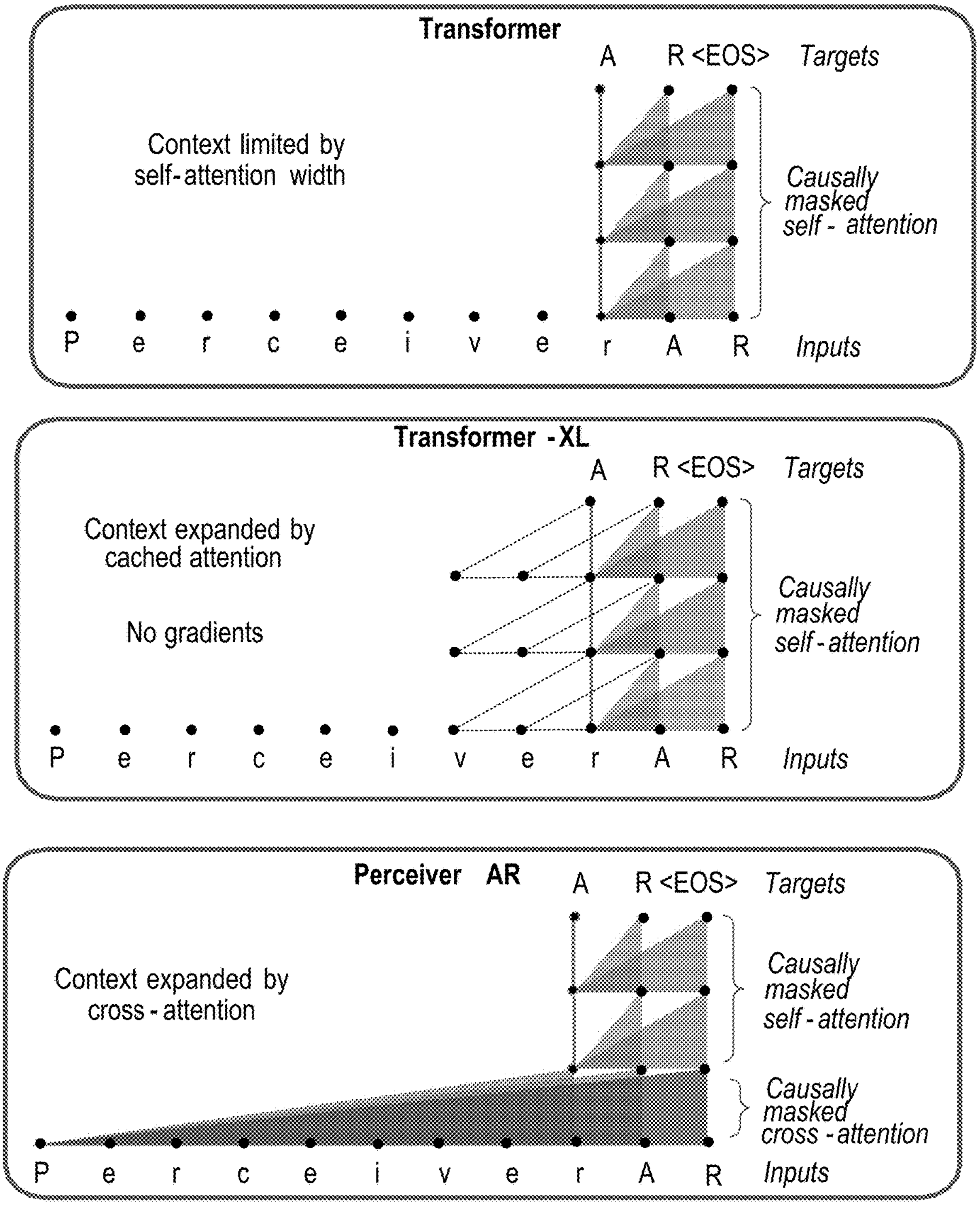
FIG. 5 illustrates an example attention operation performed by the neural network system described in this specification and other available systems.
Figure 6:
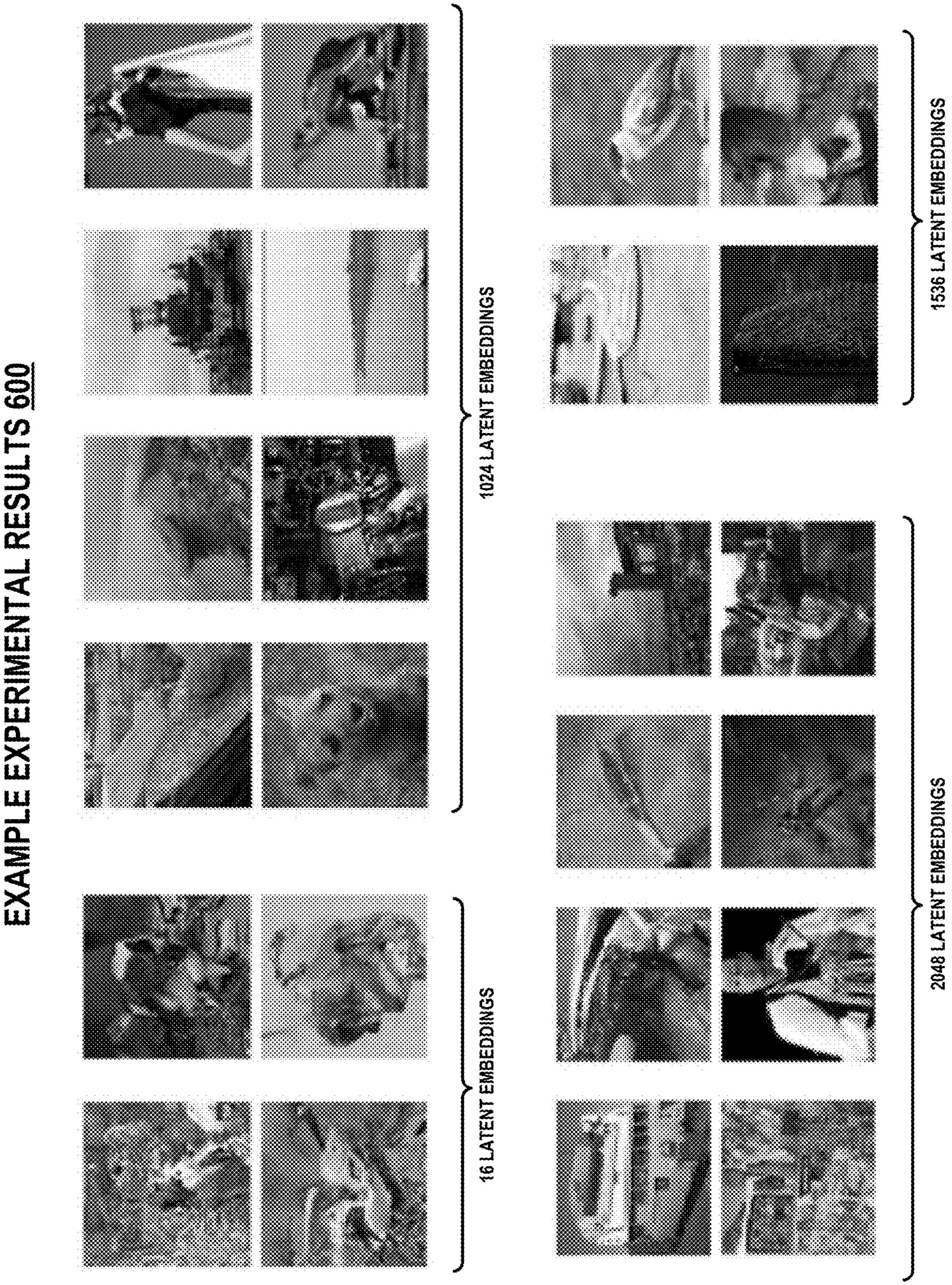
FIG. 6 illustrates example experimental results achieved using the neural network system.

FIG. 5 illustrates an example attention operation performed by the neural network system described in this specification (e.g., the neural network system 100 of FIG. 1, or the neural network system 200 of FIG. 2) and other available systems. In particular, FIG. 5 illustrates a context range of the neural network system described in this specification and other available systems. Generally, a "context range" refers to how many preceding data element embeddings the system is able to attend to in order to enrich latent embeddings with information when performing the attention operation. It can be appreciated that the context range 500 of the neural network system described in this specification ("Perceiver AR" in FIG. 5) is significantly more expansive than the context range 500 of the alternative systems ("Transformer XL" and "Transformer" in FIG. 5). In particular, the neural network system described in this specification is able to enrich latent embeddings with information from a much larger number of data element embeddings, without requiring a larger number of latent embeddings (e.g., a wider self-attention stack). Therefore, the neural network system described in this specification provides the cross-attention and self-attention operations that operate synergistically to enable the neural network system to significantly reduce consumption of computational resources (e.g., compared to conventional systems) while generating sequences of data elements that encode complex long-range patterns FIG. 6 illustrates example experimental results 600 achieved using the neural network system (e.g., the neural network system 100 of FIG. 1, or the neural network system 200 of FIG. 2). Specifically, FIG. 6 illustrates four panels of images, where each panel includes images that were generated by the neural network system using a particular number of latent embeddings in the sequence of latent embeddings. The first panel shows images generated using only 16 latent embeddings. The second panel shows images generated using 1024 latent embeddings. The third panel shows images generated using 1536 latent embeddings. The last panel shows images generated using 2048 latent embeddings.

It can be appreciated that the neural network system described in this specification is able to intelligently share information across the latent embeddings in the sequence of latent embeddings and perform sophisticated implicit reasoning, in some cases, irrespective of the length of the sequence. In other words, as illustrated in FIG. 6, the system is able to effectively generate images using sequences of latent embeddings containing as little as 16 latent embeddings, and as many as 2048 latent embeddings.

FIG. 7 illustrates another example of experimental results achieved using the neural network system (e.g., the neural network system 100 of FIG. 1, or the neural network system 200 of FIG. 2). In particular, FIG. 7 shows language modeling results in perplexity (ppl.), where lower is better, of the neural network system described in this specification (e.g., "Perceiver AR") and alternative neural network systems. It can be appreciated that the neural network system described in this specification can provide a longer context length and significantly outperforms the alternative systems on language modeling tasks.

FIG. 8A and FIG. 8B illustrate another example of experimental results 800 achieved using the neural network system (e.g., the neural network system 100 of FIG. 1, or the neural network system 200 of FIG. 2). In particular, FIG. 8A shows music generation results in negative log-likelihood, where lower is better, of the neural network system described in this specification (e.g., "Perceiver AR") and alternative neural network systems. FIG. 8B shows audio generation results for a fixed context length of 65536 in negative log-likelihood, where lower is better, of the neural network system described in this specification (e.g., "Perceiver AR") and alternative neural network systems. As shown in FIG. 8A and FIG. 8B, the neural network system described in this specification can significantly outperform the alternative systems on music/audio generation tasks.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:

generating a sequence of data elements that comprises a respective data element at each position in a sequence of positions, comprising, for each of a plurality of positions after a first position in the sequence of positions:

obtaining a current sequence of data element embeddings that comprises a respective data element embedding of each data element at a position that precedes a current position;

obtaining a sequence of latent embeddings, comprising:

determining the sequence of latent embeddings based only on a predefined number of last data element embeddings from the current sequence of data element embeddings as context, wherein the predefined number of data element embeddings is less than a total number of data element embeddings in the current sequence of data element embeddings;

processing: (i) the current sequence of data element embeddings, and (ii) the sequence of latent embeddings, using a neural network to generate a data element at the current position, wherein the neural network comprises a sequence of neural network blocks comprising: (i) a cross-attention block, (ii) one or more self-attention blocks, and (iii) an output block, wherein the cross-attention block performs operations comprising:

updating each latent embedding in the sequence of latent embeddings using attention over the current sequence of data element embeddings;

wherein each self-attention block performs operations comprising:

updating each latent embedding in the sequence of latent embeddings using attention over the sequence of latent embeddings; and wherein the output block performs operations comprising:

after the sequence of latent embeddings are updated using the cross-attention block and the one or more self-attention blocks, processing one or more latent embeddings from the sequence of latent embeddings to generate the data element at the current position.

2. The method of claim 1, wherein updating each latent embedding in the sequence of latent embeddings using attention over the current sequence of data element embeddings comprises:

updating each latent embedding in the sequence of latent embeddings using masked attention over the current sequence of data element embeddings.

3. The method of claim 2, wherein each latent embedding corresponds to a respective position in the sequence of positions, and wherein updating each latent embedding in the sequence of latent embeddings using masked attention over the current sequence of data element embeddings comprises, for each latent embedding:

updating the latent embedding using attention over only: (i) the data element embedding at the position corresponding to the latent embedding, and (ii) any data element embeddings at positions preceding the position corresponding to the latent embedding.

4. The method of claim 1, wherein updating each latent embedding in the sequence of latent embeddings using attention over the sequence of latent embeddings comprises:

updating each latent embedding in the sequence of latent embeddings using masked attention over the sequence of latent embeddings.

5. The method of claim 4, wherein updating each latent embedding in the sequence of latent embeddings using masked attention over the sequence of latent embeddings comprises, for each latent embedding in the sequence of latent embeddings:

updating the latent embedding using attention over only: (i) the latent embedding, and (ii) any latent embeddings that precede the latent embedding in the sequence of latent embeddings.

6. The method of claim 1, wherein determining the sequence of latent embeddings based only on a predefined number of last data element embeddings from the current sequence of data element embeddings comprises:

setting the sequence of latent embeddings equal to the predefined number of last data element embeddings of the current sequence of data element embeddings.

7. The method of claim 1, wherein generating the data element at the current position comprises:

processing the one or more latent embeddings from the sequence of latent embeddings to generate a score distribution over a set of possible data elements; and selecting the data element at the current position using the score distribution over the set of possible data elements.

8. The method of claim 7, wherein selecting the data element at the current position using the score distribution over the set of possible data elements comprises:

sampling the data element at the current position from the set of possible data elements in accordance with the score distribution over the set of possible data elements.

9. The method of claim 1, wherein for each of one or more positions in the sequence of positions:

a number of latent embeddings in the sequence of latent embeddings is less than a number of data element embeddings in the current sequence of data element embeddings.

10. The method of claim 9, wherein the number of latent embeddings is at least an order of magnitude less than the number of data element embeddings.

11. The method of claim 1, wherein for each position after the first position in the sequence of positions, a number of latent embeddings in the sequence of latent embeddings is predefined and independent of a number of data element embeddings in the current sequence of data element embeddings.

12. The method of claim 1, wherein generating the sequence of data elements comprises autoregressively generating the sequence of data elements.

13. The method of claim 1, wherein the sequence of data elements defines an image.

14. The method of claim 1, wherein the sequence of data elements defines an audio waveform.

15. The method of claim 1, wherein the sequence of data elements defines a sequence of musical notes.

16. The method of claim 1, wherein the sequence of data elements defines a structure of a protein.

17. A system comprising:

one or more computers; and one or more storage devices communicatively coupled to the one or more computers, wherein the one or more storage devices store instructions that, when executed by the one or more computers, cause the one or more computers to perform operations comprising:

generating a sequence of data elements that comprises a respective data element at each position in a sequence of positions, comprising, for each of a plurality of positions after a first position in the sequence of positions:

obtaining a current sequence of data element embeddings that comprises a respective data element embedding of each data element at a position that precedes a current position;

obtaining a sequence of latent embeddings, comprising:

determining the sequence of latent embeddings based only on a predefined number of last data element embeddings from the current sequence of data element embeddings as context, wherein the predefined number of data element embeddings is less than a total number of data element embeddings in the current sequence of data element embeddings;

processing: (i) the current sequence of data element embeddings, and (ii) the sequence of latent embeddings, using a neural network to generate a data element at the current position, wherein the neural network comprises a sequence of neural network blocks comprising: (i) a cross-attention block, (ii) one or more self-attention blocks, and (iii) an output block, wherein the cross-attention block performs operations comprising:

updating each latent embedding in the sequence of latent embeddings using attention over the current sequence of data element embeddings;

wherein each self-attention block performs operations comprising:

updating each latent embedding in the sequence of latent embeddings using attention over the sequence of latent embeddings; and wherein the output block performs operations comprising:

after the sequence of latent embeddings are updated using the cross-attention block and the one or more self-attention blocks, processing one or more latent embeddings from the sequence of latent embeddings to generate the data element at the current position.

18. One or more non-transitory computer storage media storing instructions that when executed by one or more computers cause the one or more computers to perform operations comprising:

generating a sequence of data elements that comprises a respective data element at each position in a sequence of positions, comprising, for each of a plurality of positions after a first position in the sequence of positions:

obtaining a current sequence of data element embeddings that comprises a respective data element embedding of each data element at a position that precedes a current position;

obtaining a sequence of latent embeddings, comprising:

determining the sequence of latent embeddings based only on a predefined number of last data element embeddings from the current sequence of data element embeddings as context, wherein the predefined number of data element embeddings is less than a total number of data element embeddings in the current sequence of data element embeddings;

processing: (i) the current sequence of data element embeddings, and (ii) the sequence of latent embeddings, using a neural network to generate a data element at the current position, wherein the neural network comprises a sequence of neural network blocks comprising: (i) a cross-attention block, (ii) one or more self-attention blocks, and (iii) an output block, wherein the cross-attention block performs operations comprising:

updating each latent embedding in the sequence of latent embeddings using attention over the current sequence of data element embeddings;

wherein each self-attention block performs operations comprising:

updating each latent embedding in the sequence of latent embeddings using attention over the sequence of latent embeddings; and wherein the output block performs operations comprising:

after the sequence of latent embeddings are updated using the cross-attention block and the one or more self-attention blocks, processing one or more latent embeddings from the sequence of latent embeddings to generate the data element at the current position.

* * * * *